(12) United States Patent
Yasuda et al.

(10) Patent No.: US 10,171,177 B2
(45) Date of Patent: Jan. 1, 2019

(54) DIGITAL SIGNAL PROCESSOR, DIGITAL OPTICAL RECEIVER USING THE SAME, AND DIGITAL SIGNAL PROCESSING METHOD

(71) Applicant: NEC Corporation, Minato-ku, Tokyo (JP)

(72) Inventors: Wakako Yasuda, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/534,120

(22) PCT Filed: Dec. 15, 2015

(86) PCT No.: PCT/JP2015/006245
§ 371 (c)(1),
(2) Date: Jun. 8, 2017

(87) PCT Pub. No.: WO2016/103631
PCT Pub. Date: Jun. 30, 2016

(65) Prior Publication Data
US 2017/0338895 A1 Nov. 23, 2017

(30) Foreign Application Priority Data
Dec. 22, 2014 (JP) ................................. 2014-259002

(51) Int. Cl.
*H04B 10/03* (2013.01)
*H04B 10/69* (2013.01)
(Continued)

(52) U.S. Cl.
CPC ..... *H04B 10/6971* (2013.01); *H04B 10/2507* (2013.01); *H04B 10/61* (2013.01); *H04J 11/00* (2013.01); *H04L 25/03885* (2013.01)

(58) Field of Classification Search
CPC .. H04N 5/235; H04N 5/365; H04L 25/03019; H04L 25/03261; H04L 25/03878;
(Continued)

(56) References Cited

U.S. PATENT DOCUMENTS

| | | | | |
|---|---|---|---|---|
| 5,175,747 A | * | 12/1992 | Murakami | ........ H04L 25/03057 333/18 |
| 6,359,870 B1 | * | 3/2002 | Inoue | ................... H04B 1/1615 370/337 |
| 2017/0338979 A1 | * | 11/2017 | Lin | ....................... H04L 7/0087 |

FOREIGN PATENT DOCUMENTS

JP   2011-009956 A   1/2011

OTHER PUBLICATIONS

Corsini, R., et al, "*Blind Adaptive Chromatic Dispersion Compensation and Estimation for DSP-Based Coherent Optical Systems*", Journal of Lightwave Technology, IEEE, vol. 31, No. 13, Jul. 1, 2013, pp. 2131-2139, (9 pages total).

(Continued)

*Primary Examiner* — Don N Vo

(57) ABSTRACT

It is difficult to obtain a demodulated signal with high signal quality in a digital optical receiver because it is difficult to compensate for each of different types of waveform distortion by a high-performance equalization process; therefore, a digital signal processor according to an exemplary aspect of the present invention includes a fixed equalization means for performing a distortion compensation process based on a fixed equalization coefficient on an input digital signal; an adaptive equalization means for performing an adaptive distortion compensation process based on an adaptive equalization coefficient on an equalized digital signal output by the fixed equalization means; a low-speed signal generation means for generating a low-speed digital signal by intermittently extracting one of the input digital signal and the equalized digital signal; a low-speed equalization coefficient (Continued)

calculation means for calculating a low-speed equalization coefficient to be used for a distortion compensation process of the low-speed digital signal; and a fixed equalization coefficient calculation means for calculating the fixed equalization coefficient by using at least a predetermined coefficient out of the low-speed equalization coefficient and the predetermined coefficient.

18 Claims, 9 Drawing Sheets

(51) Int. Cl.
*H04B 10/2507* (2013.01)
*H04B 10/61* (2013.01)
*H04J 11/00* (2006.01)
*H04L 25/03* (2006.01)

(58) Field of Classification Search
CPC .......... H04L 25/03885; H04B 10/6971; H04B 10/2507; H04B 10/61; H04J 11/00
USPC .................... 398/45, 208; 375/232–234
See application file for complete search history.

(56) References Cited

OTHER PUBLICATIONS

Paskov, M., et al., "*Blind Adaptive Equalization of Chromatic Dispersion for PDM-QPSK*", 2014 OptoElectronics and Communication Conference and Australian Conference on Optical Fibre Technology, Jul. 6-10, 2014, pp. 947-949, (3 pages total).

Maeda, W., et al., "*Hardware-efficient Polarization Demultiplexing for QAM Signals Based on Dual Stage Decision-Directed Algorithm*", 2012 Optical Fiber Communication Conference and Exposition and the National Fiber Optic Engineers Conference (OFC/NFOEC) Technical Digest, 2012 (3 pages total).

International Search Report, issued by International Searching Authority in corresponding International Application No. PCT/JP2015/006245, dated Feb. 2, 2016.

* cited by examiner

DIGITAL SIGNAL PROCESSOR, DIGITAL OPTICAL RECEIVER USING THE SAME, AND DIGITAL SIGNAL PROCESSING METHOD This application is a National Stage Entry of PCT/JP2015/006245 filed on Dec. 15, 2015, which claims priority from Japanese Patent Application 2014-259002 filed on Dec. 22, 2014, the contents of all of which are incorporated herein by reference, in their entirety.

TECHNICAL FIELD

The present invention relates to digital signal processors, digital optical receivers using the digital signal processors, and digital signal processing methods, in particular, to a digital signal processor, a digital optical receiver using the digital signal processor, and a digital signal processing method that are used for a coherent optical communication system.

BACKGROUND ART

With the spread of the Internet, communications have become part of infrastructures in today's society. An amount of data dealt with per user is increasing yearly and so is a network traffic. In an optical fiber transmission line that particularly takes a major role in trunk communications among network infrastructures, an optical transmission system with a capacity of 100 Gb/s (Giga bits per second) per channel has been commercialized. In the days ahead, extending the range of 100-Gb/s optical transmission system and increasing the capacity of a 400 Gb/s optical transmission system and the like are anticipated.

In a 100-Gb/s optical transmission system, Quadrature Phase Shift Keying (QPSK) scheme is used as a modulation scheme. A polarization-multiplexed QPSK signal is received with a combination of a coherent optical front-end and a digital signal processor.

A typical configuration of a digital coherent optical receiver is illustrated in FIG. 9 (see Patent Literature 1, for example). A related digital coherent optical receiver 600 includes an optical front-end 610, an analog-digital (A/D) converter 620, and a signal processing LSI 630. The signal processing LSI 630 includes a dispersion compensation unit 631, a polarization splitting unit 632, and a carrier recovery unit 633.

In the optical front-end 610, polarization-multiplexed QPSK modulated signal light is converted into electrical signals XI, XQ, YI, and YQ that are orthogonal components in polarization and phase. These electrical signals are converted into digital signals by the A/D converter 620 and then are demodulated in the signal processing LSI 630. The dispersion compensation unit 631 included in the signal processing LSI 630 compensates for waveform distortion caused by the chromatic dispersion that a QPSK signal has suffered while propagating through an optical fiber transmission line. The polarization splitting unit 632 separates a polarization-multiplexed signal by controlling filter coefficients of an adaptive equalization filter using an algorithm such as the Constant Modulus Algorithm (CMA). The carrier recovery unit 633 compensates for a phase difference and a frequency difference between signal light and local light and recovers a carrier signal.

The dispersion compensation unit 631 requires a filtering operation circuit with several hundreds to several thousands of taps in order to compensate for dispersion that amounts to several thousands to several hundreds of thousands picoseconds per nanometer (ps/nm). On the other hand, a range of variation with time in the chromatic dispersion that occurs in an optical transmission line is small. For these reasons, the dispersion compensation unit 631 is implemented by a Frequency Domain Equalization (FDE) circuit, which has high circuit efficiency because of a large-scale filtering operation although the control of the filter coefficients is fixed.

The polarization splitting unit 632 requires an adaptive equalization circuit that is capable of adaptively controlling a filter coefficient in order to follow polarization variations of several kHz. Because the polarization mode dispersion that occurs in an optical transmission line is about several tens of picoseconds, a filtering operation circuit with a small number of taps can be used sufficiently. For these reasons, the polarization splitting unit 632 is implemented by a Time Domain Equalization (TDE) circuit, which is capable of adaptively controlling the filter coefficients.

CITATION LIST

Patent Literature

PTL 1: Japanese Patent Application Laid-Open Publication No. 2011-009956

SUMMARY OF INVENTION

Technical Problem

In the signal processing LSI 630 included in the above-mentioned related digital coherent optical receiver 600, in order to ensure adequate compensation performance of the TDE circuit with maintaining fast control, a huge circuit size is needed. Accordingly, a fast TDE circuit is implemented by choosing a tap length for the TDE circuit that is smaller than a required number, choosing an oversampling rate for the TDE circuit that is slower than that of the FDE circuit, setting computation precision for the TDE circuit lower than that of the FDE circuit, or the like. In this case, the FDE circuit performs fixed equalization, which provides relatively high performance, and the TDE circuit performs adaptive equalization, which provides relatively low performance.

The waveform distortion caused by the chromatic dispersion that an optical signal has suffered in an optical transmission line is a known static waveform distortion because variations with time are small, and because a compensation coefficient can be obtained by back calculation from a transfer function of the optical transmission line. In contrast, the distortion caused by imperfection in the characteristics of an optical front-end or an A/D converter varies only slightly with time; however, it is an unknown static waveform distortion because there is no means to observe the distortion readily. In addition, the waveform distortion caused by polarization variations and polarization mode dispersion that an optical signal has suffered in an optical transmission line is a dynamic waveform distortion because such distortion varies with time and is difficult to observe.

A signal containing these three types of distortion is first subjected to a high-performance fixed equalization process in the FDE circuit to compensate for the known static waveform distortion. At this point, the unknown static waveform distortion and the dynamic waveform distortion are not compensated for and remain in the signal. The signal containing the remaining two types of distortion is then subjected to a low-performance adaptive equalization process in the TDE circuit to compensate for the dynamic waveform distortion. Because the TDE circuit performs adaptive equalization in this process, the unknown static waveform distortion can also be compensated for at the same time. In this way, the three types of distortion described above can be compensated for by the FDE circuit and the TDE circuit.

However, although variations with time in the unknown static waveform distortion are small, it is difficult to calculate a distortion compensation coefficient. For this reason, the distortion cannot be compensated for by the high-performance fixed equalization process as described above; consequently, it is compensated for by using the low-performance adaptive equalization process. This poses a problem in that the signal quality of a demodulated signal becomes lower than the case that all types of waveform distortion are compensated for by using the high-performance fixed equalization process.

Thus, there is a problem in that it is difficult to obtain a demodulated signal with high signal quality in a digital optical receiver because it is difficult to compensate for each of different types of waveform distortion by a high-performance equalization process.

An object of the present invention is to provide a digital signal processor, a digital optical receiver using the digital signal processor, and a digital signal processing method that solve the problems described above.

Solution to Problem

A digital signal processor according to an exemplary aspect of the present invention includes a fixed equalization means for performing a distortion compensation process based on a fixed equalization coefficient on an input digital signal; an adaptive equalization means for performing an adaptive distortion compensation process based on an adaptive equalization coefficient on an equalized digital signal output by the fixed equalization means; a low-speed signal generation means for generating a low-speed digital signal by intermittently extracting one of the input digital signal and the equalized digital signal; a low-speed equalization coefficient calculation means for calculating a low-speed equalization coefficient to be used for a distortion compensation process of the low-speed digital signal; and a fixed equalization coefficient calculation means for calculating the fixed equalization coefficient by using at least a predetermined coefficient out of the low-speed equalization coefficient and the predetermined coefficient.

A digital signal processing method according to an exemplary aspect of the present invention includes generating an equalized digital signal by performing a distortion compensation process based on a fixed equalization coefficient on an input digital signal; generating a low-speed digital signal by extracting the equalized digital signal intermittently; and extracting waveform distortion from the low-speed digital signal.

Advantageous Effects of Invention

The digital signal processor, the digital optical receiver using the digital signal processor, and the digital signal processing method according to the present invention enable compensation for each of different types of waveform distortion by a high-performance equalization process; therefore, a demodulated signal with high signal quality can be obtained.

EXAMPLE EMBODIMENT

Figure 1:
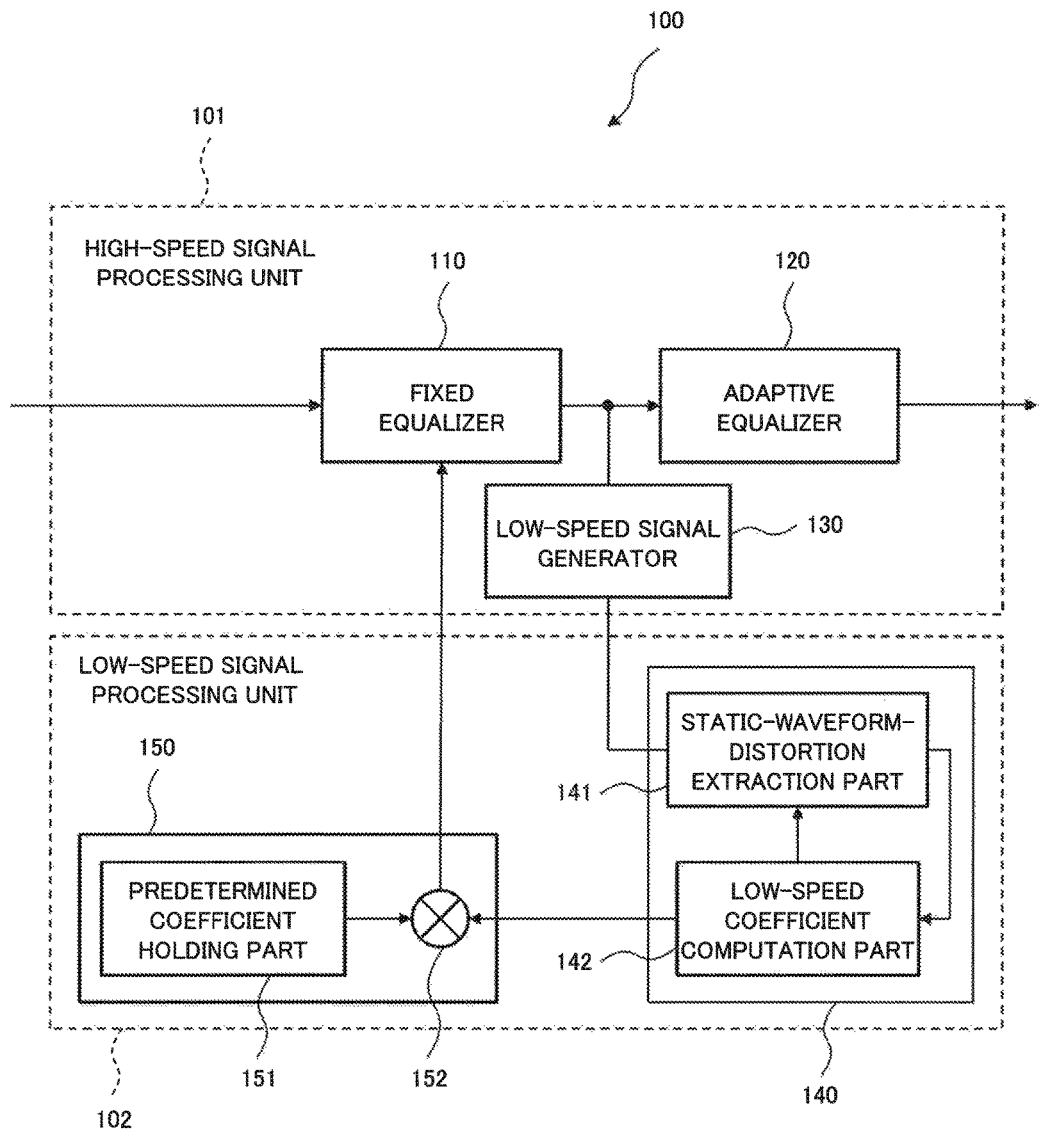
FIG. 1 is a block diagram illustrating a configuration of a digital signal processor according to a first example embodiment of the present invention.

Example embodiments of the present invention will be described below with reference to the drawings. The directions of arrows in the drawings are just examples, and they are not intended to limit the directions of signals between blocks.

First Example Embodiment

FIG. 1 is a block diagram illustrating a configuration of a digital signal processor 100 according to a first example embodiment of the present invention. The digital signal processor 100 includes a fixed equalizer 110 as a fixed equalization means, an adaptive equalizer 120 as an adaptive equalization means, a low-speed signal generator 130 as a low-speed signal generation means, a low-speed equalization coefficient calculation means 140, and a fixed equalization coefficient calculation means 150.

The fixed equalizer 110 performs a distortion compensation process based on a fixed equalization coefficient on an input digital signal. The adaptive equalizer 120 performs an adaptive distortion compensation process based on an adaptive equalization coefficient on an equalized digital signal output by the fixed equalizer 110. The low-speed signal generator 130 generates a low-speed digital signal by intermittently extracting one of the input digital signal and the equalized digital signal.

The low-speed equalization coefficient calculation means 140 calculates a low-speed equalization coefficient to be used for a distortion compensation process of the low-speed digital signal. The fixed equalization coefficient calculation means 150 calculates the fixed equalization coefficient by using at least a predetermined coefficient out of the low-speed equalization coefficient and the predetermined coefficient.

In the digital signal processor 100, the fixed equalizer 110, the adaptive equalizer 120, and the low-speed signal generator 130 constitute a high-speed signal processing unit 101. The low-speed equalization coefficient calculation means 140 and the fixed equalization coefficient calculation means 150 constitute a low-speed signal processing unit 102.

With the configuration described above, the digital signal processor 100 according to the present example embodiment enables compensation for unknown static waveform distortion contained in an input signal by using the fixed equalizer 110 instead of the adaptive equalizer 120. In other words, a higher-performance high-speed signal processing unit 101 can be implemented by using the low-speed signal processing unit 102 that can be implemented with a small-scale circuit configuration.

As illustrated in FIG. 1, the low-speed signal generator 130 can be configured to generate a low-speed digital signal from an equalized digital signal output from the fixed equalizer 110. The low-speed equalization coefficient calculation means 140 can be configured to include a static-waveform-distortion extraction part 141 as a waveform distortion extraction means and a low-speed coefficient computation part 142 as an equalization coefficient computing means. The static-waveform-distortion extraction part 141 extracts waveform distortion from a low-speed digital signal. The low-speed coefficient computation part 142 determines a low-speed equalization coefficient so as to compensate for the waveform distortion.

The fixed equalization coefficient calculation means 150 can be configured to include a predetermined coefficient holding part 151 as a predetermined coefficient holding means for holding a predetermined coefficient in advance and a computation part 152 as a computing means. The computation part 152 calculates a fixed equalization coefficient by performing a computation process on at least a predetermined coefficient out of a low-speed equalization coefficient and the predetermined coefficient.

Next, the operation of the digital signal processor 100 according to the present example embodiment will be described.

An input digital signal inputted into the digital signal processor 100 contains known static waveform distortion, unknown static waveform distortion, and dynamic waveform distortion. The input digital signal inputted into the high-speed signal processing unit 101 is then inputted into the fixed equalizer 110, where the input digital signal is equalized based on a fixed equalization coefficient calculated by the fixed equalization coefficient calculation means 150, and the known static waveform distortion is compensated for. The output signal from the fixed equalizer 110 is inputted into the adaptive equalizer 120 with the unknown static waveform distortion and the dynamic waveform distortion being contained.

The equalization performance of the adaptive equalizer 120 is set lower than that of the fixed equalizer 110 in order to give priority to a fast control. Accordingly, the compensation performance in which the adaptive equalizer 120 equalizes an unknown static waveform distortion and a dynamic waveform distortion becomes lower than the compensation performance in which the fixed equalizer 110 does.

The digital signal processor 100 according to the present example embodiment is configured to input an equalized digital signal in which the known static waveform distortion is compensated for and that is output from the fixed equalizer 110, into the low-speed signal generator 130 as well.

Then the low-speed signal generator 130 is configured to generate a low-speed digital signal by extracting intermittently the digital signal containing residual two types of distortion. The information on the dynamic waveform distortion is lost from the low-speed digital signal. Therefore, the low-speed digital signal with the information only on the unknown static waveform distortion being contained is inputted into the static-waveform-distortion extraction part 141 of the low-speed signal processing unit 102.

The static-waveform-distortion extraction part 141 extracts the unknown static waveform distortion from the low-speed digital signal. Then, the low-speed coefficient computation part 142 calculates a distortion compensation coefficient to compensate for the waveform distortion (a low-speed equalization coefficient). The distortion compensation coefficient calculated by the low-speed coefficient computation part 142 is multiplied in the computation part 152 by a distortion compensation coefficient set in the predetermined coefficient holding part 151 (a predetermined coefficient), and the result is fed back to the fixed equalizer 110 of the high-speed signal processing unit 101.

The configuration described above enables the input digital signal inputted into the high-speed signal processing unit 101 to be inputted into the fixed equalizer 110, where the input digital signal is equalized based on the information obtained from the predetermined coefficient holding part 151 and the low-speed coefficient computation part 142. At this point, the known static waveform distortion and the unknown static waveform distortion are compensated for. On the other hand, the adaptive equalizer 120 compensates for remaining dynamic waveform distortion.

As described above, the digital signal processor 100 according to the present example embodiment enables the unknown static waveform distortion contained in the input signal to be compensated for by using the fixed equalizer 110 instead of the adaptive equalizer 120. In other words, it becomes possible to achieve a higher-performance, high-speed signal processing unit 101 by using the low-speed signal processing unit 102 that can be implemented with a small-scale circuit configuration.

Figure 2:
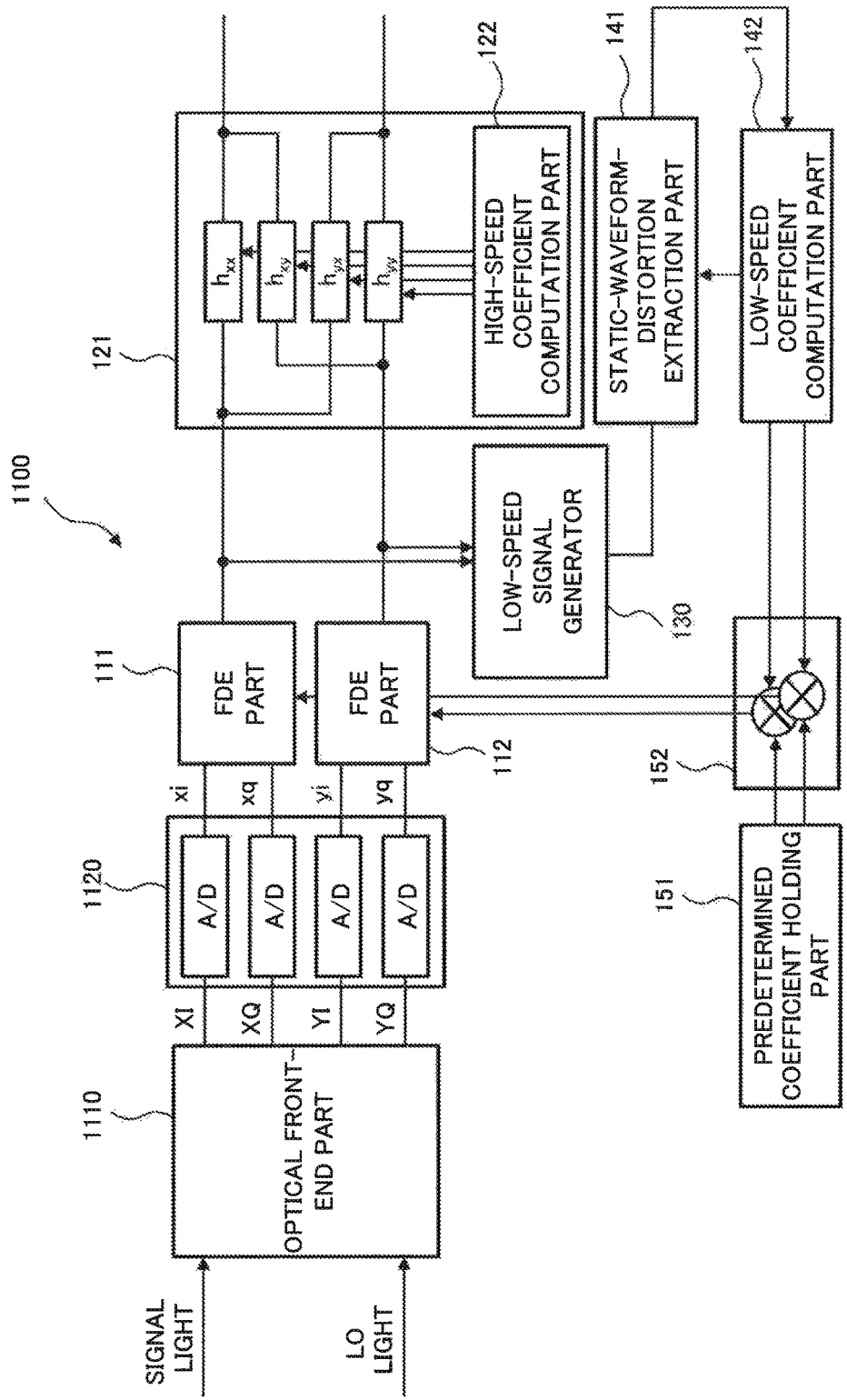
FIG. 2 is a block diagram illustrating a configuration of a digital optical receiver according to the first example embodiment of the present invention.

FIG. 2 illustrates a configuration of a digital optical receiver 1100 using the digital signal processor 100 according to the present example embodiment. Components that are the same as the components of the digital signal processor 100 illustrated in FIG. 1 are given the same reference numerals, and description thereof will not be repeated.

As illustrated in FIG. 2, the digital optical receiver 1100 includes an optical front-end part 1110 and an analog-digital converter (A/D) 1120 in addition to the configuration of the digital signal processor 100 illustrated in FIG. 1.

The fixed equalizer 110 included in the digital signal processor 100 is configured to include FDE parts 111, 112 of frequency domain equalizers that perform equalization in the frequency domain. The adaptive equalizer 120 is configured to include a TDE part part of a time domain equalizer that performs equalization in the time domain.

Next, the operation of the digital optical receiver 1100 according to the present example embodiment will be described.

The digital optical receiver 1100 receives input of signal light that has been distorted in an optical transmission line, for example, dual-polarization quadrature phase shift keying (DP-QPSK) signal light. The optical front-end part 1110 combines the inputted DP-QPSK signal light with local oscillator (LO) light, converts the resulting light into electrical signals, and outputs four-channel electrical signals XI, XQ, YI, and YQ.

Figure 3:
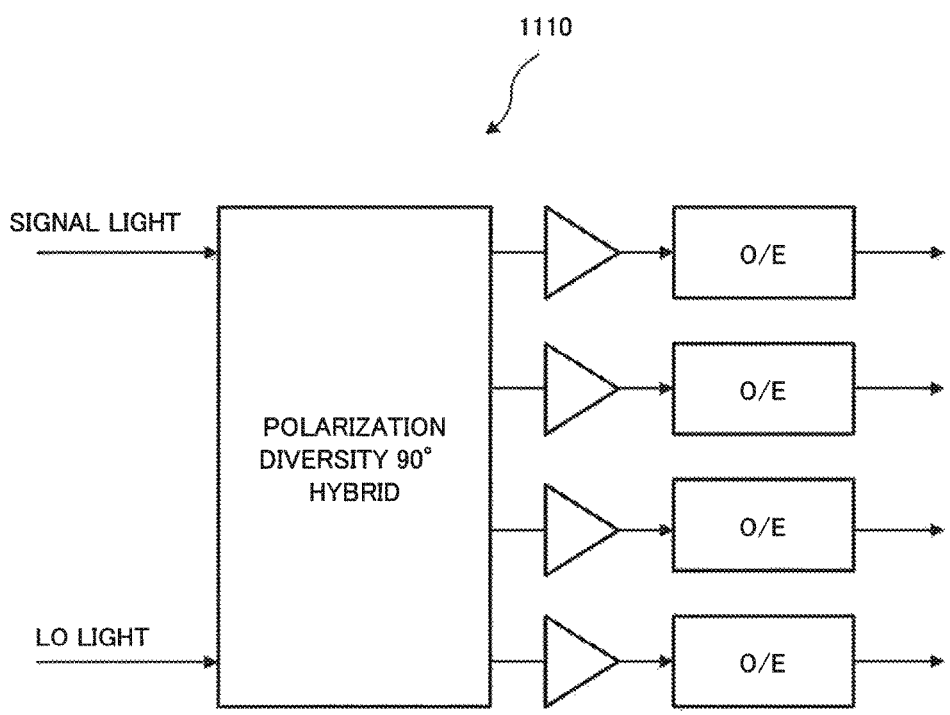
FIG. 3 is a block diagram illustrating a configuration of an optical front-end part included in the digital optical receiver according to the first example embodiment of the present invention.

FIG. 3 illustrates an example configuration of the optical front-end part 1110. The optical front-end part 1110 can have a typical configuration including a polarization diversity 90° hybrid and optical-electrical converters as illustrated in FIG. 3.

The four types of electrical signals XI, XQ, YI, and YQ output by the optical front-end part 1110 are inputted into the analog-digital converter (A/D) 1120, where the electrical signals are converted into digital signals xi, xq, yi, and yq, respectively. The digital signals xi, xq, yi, and yq contain distortion caused by device imperfections in the optical front-end part 1110 and the analog-digital converter 1120 in addition to distortion caused by chromatic dispersion, polarization variations, and polarization mode dispersion that the signal light has suffered in an optical transmission line.

The digital signals xi and xq are inputted into the FDE part 111, and yi and yq are inputted into the FDE part 112, respectively, where the digital signals are equalized based on a predetermined coefficient held in advance by the predetermined coefficient holding part 151.

Figure 4:
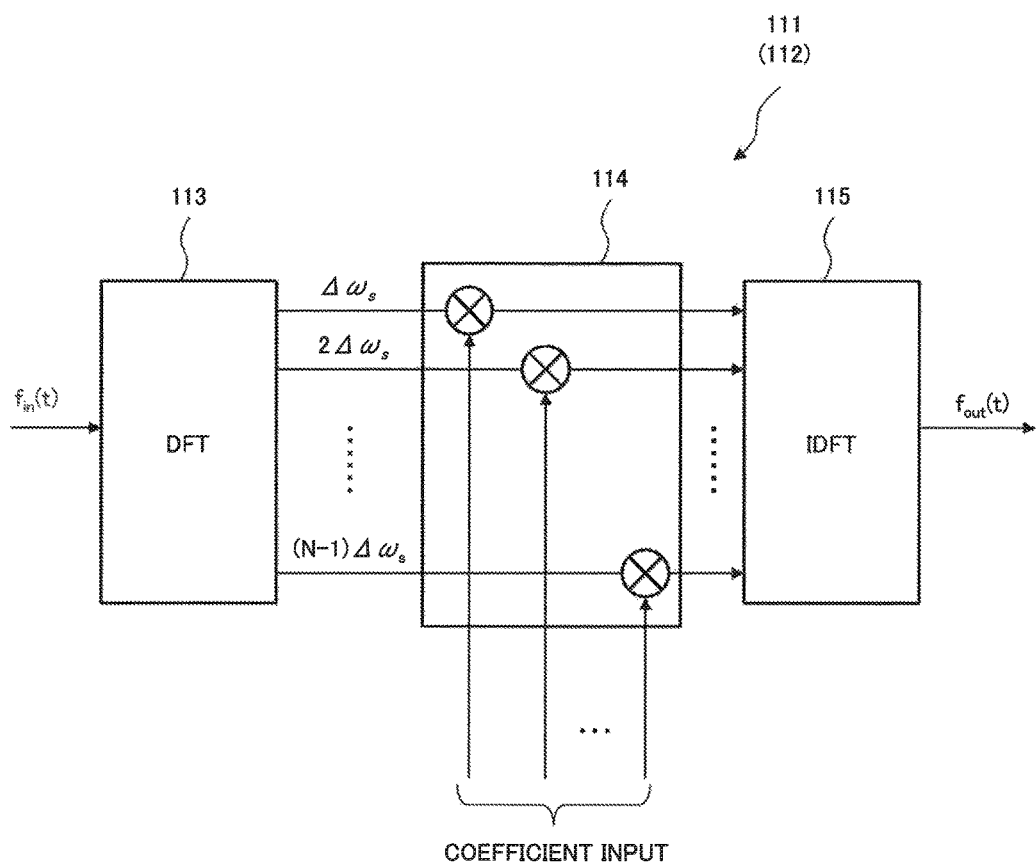
FIG. 4 is a block diagram illustrating a configuration of an FDE part included in the digital optical receiver according to the first example embodiment of the present invention.

FIG. 4 illustrates an example configuration of the FDE part 111 (112). The FDE part 111 (112) includes a discrete Fourier transform unit 113, a multiplier 114, and an inverse discrete Fourier transform unit 115.

An input signal into the FDE part 111 (112) is inputted into the discrete Fourier transform (DFT) unit 113, where the signal is subjected to discrete Fourier transform processing. The outputs from the discrete Fourier transform unit 113 are transformed into N frequency-domain signals, where N represents a discrete Fourier transform size of the discrete Fourier transform unit 113. Then, each of the signals is multiplied by a filter coefficient through the multiplier 114, and the results are inputted into the inverse discrete Fourier transform (IDFT) unit 115, where the signals are inverse-transformed into a time-domain signal.

The discrete Fourier transform size N is usually an integer of a power of 2. In that case, an algorithm such as fast Fourier transform (FFT) can be used for performing discrete Fourier transform (DFT). Thus, it is possible to obtain a frequency-domain equalization (FDE) circuit that is smaller in circuit size and lower in power consumption than a time-domain equalization with the circuit size proportional to the size N, even though the size N generally proportional to precision is increased in order to perform high-performance waveform equalization.

On the other hand, as to a large-scale FDE circuit, it is difficult to adaptively control a filter coefficient by which an input signal is multiplied. In this respect, the FDE circuit is suitable for equalization of distortion whose variations with time are small and for which a compensation coefficient is well known.

In this way, the FDE parts 111 and 112 are capable of performing high-performance fixed equalization on known static distortion. In the digital optical receiver 1100 according to the present example embodiment, the FDE parts 111 and 112 compensate for chromatic dispersion for which a compensation coefficient can be easily calculated and whose variations with time are small.

Signals equalized in frequency domain by the FDE parts 111 and 112 are inputted into the TDE part 121 as illustrated in FIG. 2, where the signals are subjected to time-domain equalization.

As illustrated in FIG. 2, the TDE part 121 is composed of a butterfly-type finite impulse response (FIR) filter, for example, and a filter coefficient thereof is updated using the computational results by a high-speed coefficient computation part 122. An adaptive equalization algorithm such as a constant modulus algorithm (CMA) and a decision directed (DD) algorithm can be used. The CMA is often used in terms of implementation when fast adaptive equalization processing is required in a device such as a high-speed signal processor. Since the CMA is an adaptive equalization algorithm, the CMA can follow dynamic waveform distortion. In addition, since the CMA is a blind equalization algorithm, the CMA can perform the equalization even though a factor for waveform distortion to be compensated for is unidentified, regardless of whether the waveform distortion is dynamic or static.

On the other hand, if adequate compensation performance of the TDE part 121 is to be achieved while maintaining fast control, a huge circuit size will be required. Therefore, a shorter tap length of the TDE part 121 than a required number is chosen, and a slower oversampling rate of the TDE part 121 than that of the FDE part 111 is chosen. Further, the fast TDE part 121 is achieved by setting its computation precision lower than that of the FDE part 111. In other words, the equalization performance of the TDE part 121 (time-domain equalizer) is set lower than that of the FDE parts 111 and 112 (frequency-domain equalizers).

In this way, the TDE part 121 is capable of performing low-performance adaptive equalization for unknown distortion. In the digital optical receiver 1100 according to the present example embodiment, the TDE part 121, with low equalization performance, compensates for static distortion caused by device imperfection of the optical front-end part 1110 and the analog-digital converter (A/D) 1120, for which a compensation coefficient cannot be easily calculated. Further, the TDE part 121 also compensates for dynamic distortion caused by polarization variations and polarization mode dispersion.

On the other hand, digital signals equalized in frequency domain by the FDE parts 111 and 112 are also inputted into the low-speed signal generator 130. The low-speed signal generator 130 intermittently extracts a digital signal containing two types of distortion and generates a low-speed digital signal. The information on dynamic waveform distortion has been lost in the low-speed digital signal. Consequently, the low-speed digital signal with only information on static waveform distortion other than chromatic dispersion is inputted into the static-waveform-distortion extraction part 141.

The static-waveform-distortion extraction part 141 extracts static waveform distortion other than chromatic dispersion from the low-speed digital signal. The low-speed coefficient computation part 142 calculates a distortion compensation coefficient (a low-speed equalization coefficient) to compensate for the waveform distortion. The distortion compensation coefficient calculated in the low-speed coefficient computation part 142 is multiplied in the computation part 152 by a dispersion compensation coefficient (a predetermined coefficient) set in the predetermined coefficient holding part 151, and the result is fed back to the FDE parts 111 and 112.

At this point, the input digital signals inputted into the FDE units 111 and 112 are subjected to an equalization process based on the information obtained from the predetermined coefficient holding part 151 and the low-speed coefficient computation part 142. Accordingly, static waveform distortion caused by chromatic dispersion and static waveform distortion caused by factors other than chromatic dispersion are compensated for. Then the TDE part 121 compensates for dynamic distortion such as polarization variation and polarization mode dispersion.

The configuration described above enables the digital optical receiver 1100 according to the present example embodiment to compensate for unknown static waveform distortion that is caused by factors other than chromatic dispersion and is contained in an input signal by using the fixed equalizers (the FDE parts 111 and 112) instead of the adaptive equalizer (the TDE part 121). In other words, it becomes possible to achieve a higher-performance, high-speed signal processor by using the low-speed signal processor that can be implemented with a small-scale circuit configuration.

Next, a digital signal processing method according to the present example embodiment will be described.

In the digital signal processing method according to the present example embodiment, first, an equalized digital signal is generated by performing a distortion compensation process based on a fixed equalization coefficient on an input digital signal. A low-speed digital signal is generated by extracting the equalized digital signal intermittently. Then waveform distortion is extracted from the low-speed digital signal. This configuration makes it possible to monitor unknown static waveform distortion contained in the input digital signal.

Then a low-speed equalization coefficient is determined so as to compensate for the waveform distortion, and a fixed equalization coefficient is calculated by performing a computation process on the low-speed equalization coefficient and a predetermined coefficient held in advance. Applying the above-mentioned distortion compensation process using the fixed equalization coefficient calculated here makes it possible to compensate, with high equalization performance, for not only known static waveform distortion contained in the input digital signal but also unknown static waveform distortion.

As described above, according to the digital signal processor 100, the digital optical receiver 1100 using the digital signal processor, and the digital signal processing method of the present example embodiment, it becomes possible to compensate for each of different types of waveform distortion by a high-performance equalization process. As a result, a demodulated signal with high signal quality can be obtained.

Second Example Embodiment

Next, a second example embodiment of the present invention will be described.

Figure 5:
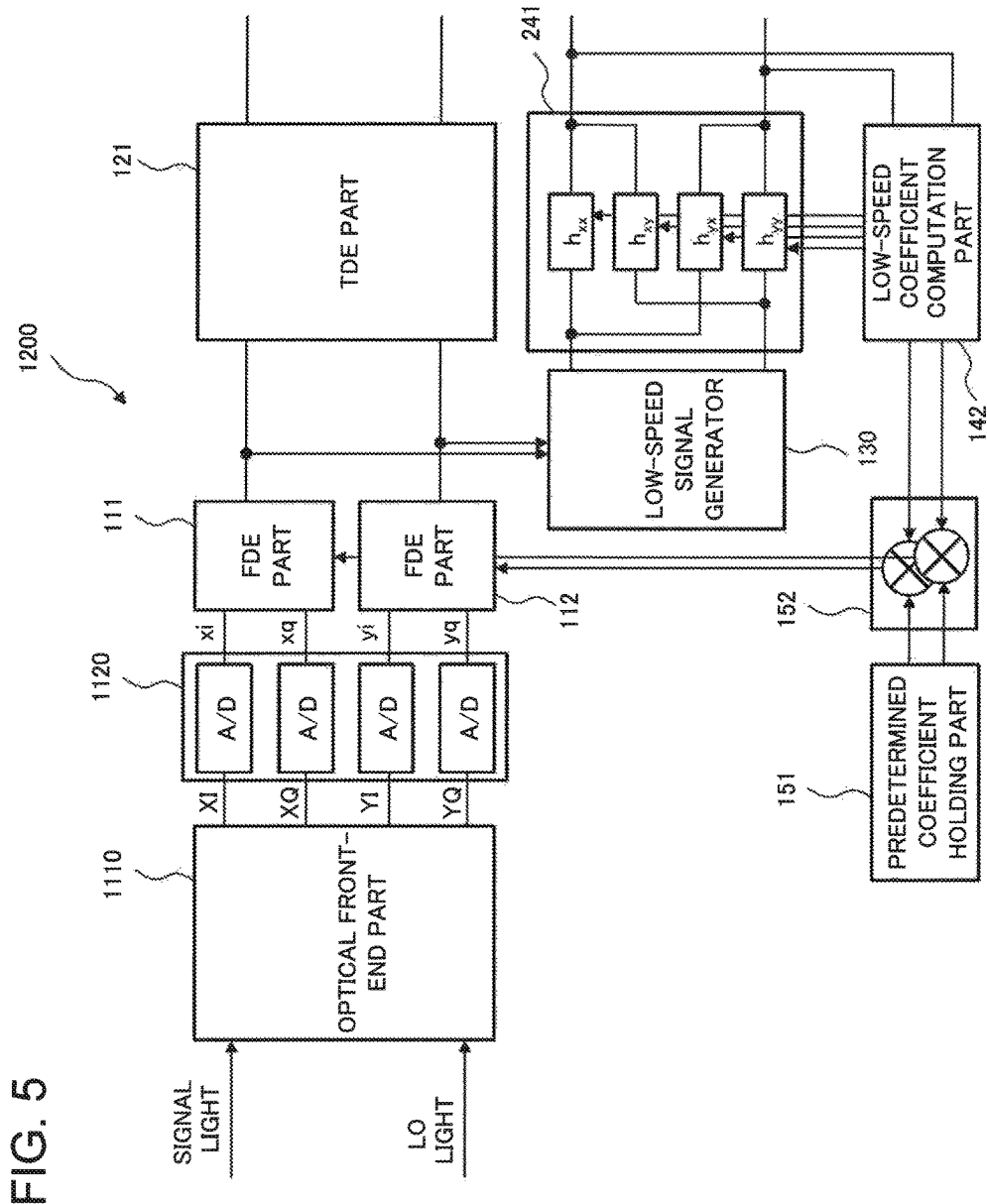
FIG. 5 is a block diagram illustrating a configuration of a digital optical receiver according to a second example embodiment of the present invention.

FIG. 5 illustrates a configuration of a digital optical receiver 1200 according to the second example embodiment of the present invention. Components that are the same as those of the digital optical receiver 1100 according to the first example embodiment illustrated in FIG. 2 are given the same reference numerals, and description thereof will not be repeated.

As illustrated in FIG. 5, the digital optical receiver 1200 according to the present example embodiment has a configuration in which a static-waveform-distortion extraction part as a waveform distortion extraction means includes a filter part 241 (filter means) that performs a filtering process based on a filter coefficient. A low-speed coefficient computation part 142 as an equalization coefficient computing means is configured to update a filter coefficient for the filter part 241 depending on an output signal from the filter part 241.

Next, the operation of the digital optical receiver 1200 according to the present example embodiment will be described.

The digital optical receiver 1200 receives input of signal light that has been distorted in an optical transmission line, for example, dual-polarization quadrature phase shift keying (DP-QPSK) signal light. An optical front-end part 1110 combines the inputted DP-QPSK signal light with local oscillator (LO) light, converts the resulting light into electrical signals, and outputs four-channel electrical signals XI, XQ, YI, and YQ.

The four types of electrical signals XI, XQ, YI, and YQ output by the optical front-end part 1110 are inputted into an analog-digital converter (A/D) 1120, where the electrical signals are converted into digital signals xi, xq, yi, and yq, respectively. The digital signals xi, xq, yi, and yq contain distortion caused by device imperfections in the optical front-end part 1110 and the analog-digital converter 1120 in addition to distortion caused by chromatic dispersion, polarization variations, and polarization mode dispersion that the signal light has suffered in an optical transmission line.

The digital signals xi and xq are inputted into an FDE part 111, and yi and yq are inputted into an FDE part 112, respectively, where the digital signals are equalized based on a predetermined coefficient held in advance by a predetermined coefficient holding part 151.

The FDE parts 111 and 112 are capable of performing high-performance fixed equalization for known static distortion. In the digital optical receiver 1200 according to the present example embodiment, the FDE parts 111 and 112 compensate for chromatic dispersion for which a compensation coefficient can be easily calculated and whose variations with time are small.

Signals equalized in frequency domain by the FDE parts 111 and 112 are inputted into a TDE part 121 as illustrated in FIG. 5, where the signals are subjected to time-domain equalization.

As illustrated in FIG. 2, the TDE part 121 is composed of a butterfly-type finite impulse response (FIR) filter, for example. If adequate compensation performance of the TDE part 121 is to be achieved while maintaining fast control, a huge circuit size will be required. Therefore, a shorter tap length of the TDE part 121 than a required number is chosen, and a slower oversampling rate of the TDE part 121 than that of the FDE part 111 is chosen. Further, the fast TDE part 121 is achieved by setting its computation precision lower than that of the FDE part 111.

In this way, the TDE part 121 is capable of performing low-performance adaptive equalization for unknown distortion. In the digital optical receiver 1200 according to the present example embodiment, the TDE part 121, with low equalization performance, compensates for static distortion caused by device imperfection of the optical front-end part 1110 and the analog-digital converter (A/D) 1120, for which a compensation coefficient cannot be easily calculated. Further, the TDE part 121 also compensates for dynamic distortion caused by polarization variations and polarization mode dispersion.

On the other hand, digital signals equalized in frequency domain by the FDE parts 111 and 112 are also inputted into a low-speed signal generator 130. The low-speed signal generator 130 intermittently extracts a digital signal containing two types of distortion and generates a low-speed digital signal. The information on dynamic waveform distortion has been lost in the low-speed digital signal. Consequently, the low-speed digital signal with only information on static waveform distortion other than chromatic dispersion is inputted into the filter part 241.

The filter part 241 is composed of a butterfly-type FIR filter, for example. Depending on characteristics of distortion to be compensated for, the filter configuration, the number of filter taps, the type of filter coefficient, and the like can be chosen for the filter part 241.

Because the filter part 241 processes low-speed signals, a tap length required for achieving adequate performance can be provided without restricting the circuit size. The filter part 241 can perform the processing at the same oversampling rate as that of the FDE parts 111 and 112. In addition, the computation precision required for providing adequate performance can be ensured. Thus, the filter part 241 is capable of performing high-performance waveform equalization. The filter coefficient in this case is updated depending on the computational result by the low-speed coefficient computation part 142 using the CMA algorithm, for example.

The filter part 241 extracts static waveform distortion other than chromatic dispersion from the low-speed digital signal. The low-speed coefficient computation part 142 calculates a distortion compensation coefficient (a low-speed equalization coefficient) to compensate for the waveform distortion. The distortion compensation coefficient calculated in the low-speed coefficient computation part 142 is multiplied in the computation part 152 by a dispersion compensation coefficient (a predetermined coefficient) set in the predetermined coefficient holding part 151, and the result is fed back to the FDE parts 111 and 112.

At this point, the input digital signals inputted into the FDE parts 111 and 112 are subjected to an equalization process based on the information obtained from the predetermined coefficient holding part 151 and the low-speed coefficient computation part 142. Accordingly, static waveform distortion caused by chromatic dispersion and static waveform distortion caused by factors other than chromatic dispersion are compensated for. Then the TDE part 121 compensates for dynamic distortion such as polarization variations and polarization mode dispersion.

The configuration described above enables the digital optical receiver 1200 according to the present example embodiment to compensate for unknown static waveform distortion that is caused by factors other than chromatic dispersion and is contained in an input signal by using the fixed equalizers (the FDE parts 111 and 112) instead of the adaptive equalizer (the TDE part 121). In other words, it becomes possible to achieve a higher-performance, high-speed signal processor by using the low-speed signal processor that can be implemented with a small-scale circuit configuration.

As described above, according to the digital optical receiver 1200 of the present example embodiment, it becomes possible to compensate for each of different types of waveform distortion by a high-performance equalization process. As a result, a demodulated signal with high signal quality can be obtained.

Third Example Embodiment

Next, a third example embodiment of the present invention will be described.

Figure 6:
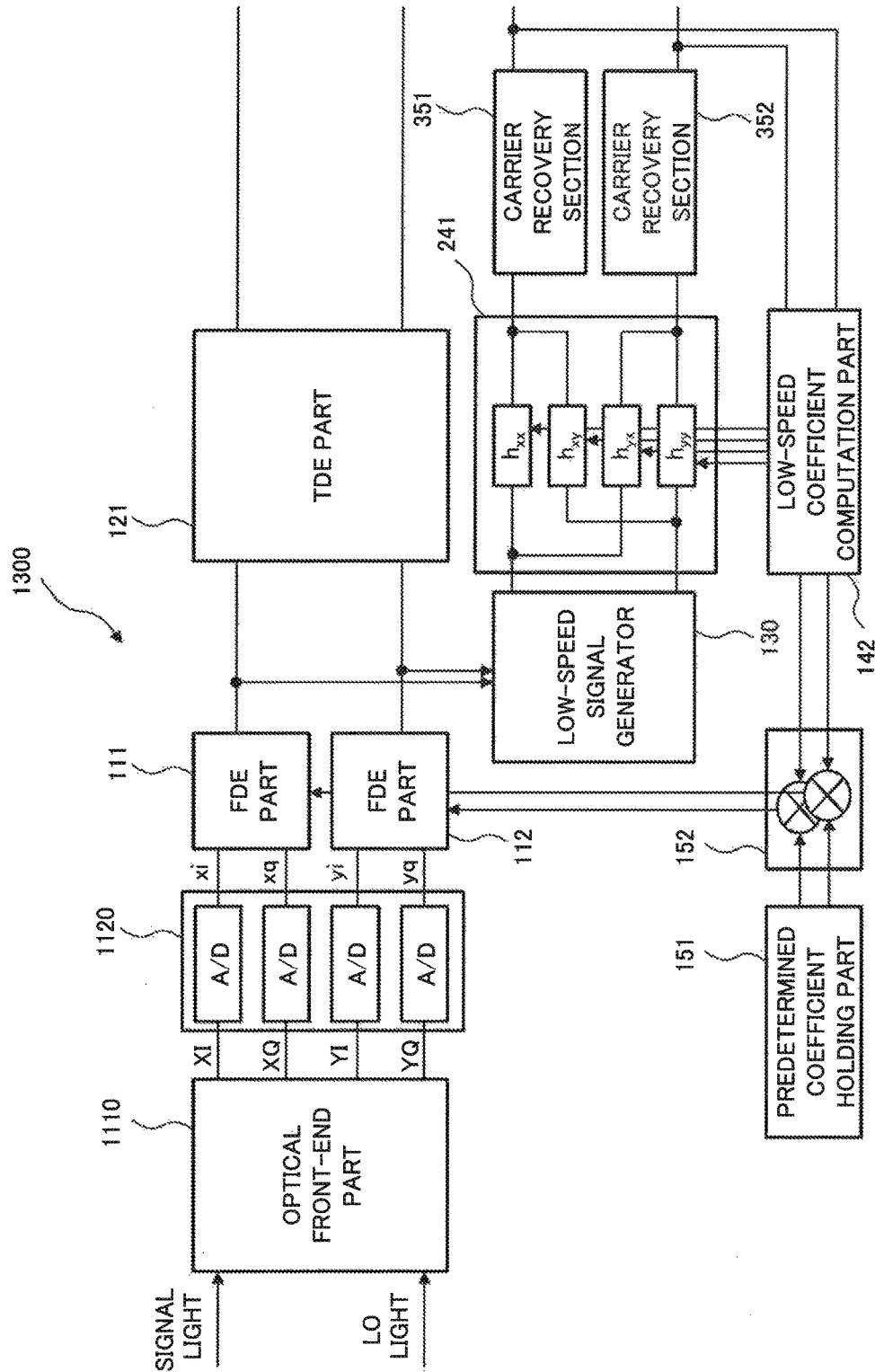
FIG. 6 is a block diagram illustrating a configuration of a digital optical receiver according to a third example embodiment of the present invention.

FIG. 6 illustrates a configuration of a digital optical receiver 1300 according to the third example embodiment of the present invention. Components that are the same as the components of the digital optical receiver 1200 according to the second example embodiment illustrated in FIG. 5 are given the same reference numerals, and description thereof will not be repeated.

As illustrated in FIG. 6, the digital optical receiver 1300 according to the present example embodiment is configured to further include carrier recovery sections (carrier signal recovery means) 351 and 352 that recover carrier signals from the output signal output by a filter part 241 as a waveform distortion extraction means. A low-speed coefficient computation part 142 as an equalization coefficient computing means is configured to calculate a low-speed equalization coefficient based on the carrier signal.

Next, the operation of the digital optical receiver 1300 according to the present example embodiment will be described.

The digital optical receiver 1300 receives input of signal light that has been distorted in an optical transmission line, for example, dual-polarization quadrature phase shift keying (DP-QPSK) signal light. An optical front-end part 1110 combines the inputted DP-QPSK signal light with local oscillator (LO) light, converts the resulting light into electrical signals, and outputs four-channel electrical signals XI, XQ, YI, and YQ.

The four types of electrical signals XI, XQ, YI, and YQ output by the optical front-end part 1110 are inputted into an analog-digital converter (A/D) 1120, where the electrical signals are converted into digital signals xi, xq, yi, and yq, respectively. The digital signals xi, xq, yi, and yq contain distortion caused by device imperfections in the optical front-end part 1110 and the analog-digital converter 1120 in addition to distortion caused by chromatic dispersion, polarization variations, and polarization mode dispersion that the signal light has suffered in an optical transmission line.

The digital signals xi and xq are inputted into an FDE part 111, and yi and yq are inputted into an FDE part 112, respectively, where the digital signals are equalized based on a predetermined coefficient held in advance by a predetermined coefficient holding part 151.

The FDE parts 111 and 112 are capable of performing high-performance fixed equalization for known static distortion. In the digital optical receiver 1300 according to the present example embodiment, the FDE parts 111 and 112 compensate for chromatic dispersion for which a compensation coefficient can be easily calculated and whose variations with time are small.

Signals equalized in frequency domain by the FDE parts 111 and 112 are inputted into a TDE part 121 as illustrated in FIG. 6, where the signals are subjected to time-domain equalization.

As illustrated in FIG. 2, the TDE part 121 is composed of a butterfly-type finite impulse response (FIR) filter, for example. If adequate compensation performance of the TDE part 121 is to be achieved while maintaining fast control, a huge circuit size will be required. Therefore, a shorter tap length of the TDE part 121 than a required number is chosen, and a slower oversampling rate of the TDE part 121 than that of the FDE part 111 is chosen. Further, the fast TDE part 121 is achieved by setting its computation precision lower than that of the FDE part 111.

In this way, the TDE part 121 is capable of performing low-performance adaptive equalization for unknown distortion. In the digital optical receiver 1300 according to the present example embodiment, the TDE part 121, with low equalization performance, compensates for static distortion caused by device imperfection of the optical front-end part 1110 and the analog-digital converter (A/D) 1120, for which a compensation coefficient cannot be easily calculated. Further, the TDE part 121 also compensates for dynamic distortion caused by polarization variations and polarization mode dispersion.

On the other hand, digital signals equalized in frequency domain by the FDE parts 111 and 112 are also inputted into a low-speed signal generator 130. The low-speed signal generator 130 intermittently extracts a digital signal containing two types of distortion and generates a low-speed digital signal. The information on dynamic waveform distortion has been lost in the low-speed digital signal. Consequently, the low-speed digital signal with only information on static waveform distortion other than chromatic dispersion is inputted into the filter part 241.

The filter part 241 is composed of a butterfly-type FIR filter, for example. Depending on characteristics of distortion to be compensated for, the filter configuration, the number of filter taps, the type of filter coefficient, and the like can be chosen for the filter part 241.

Because the filter part 241 processes low-speed signals, a tap length required for achieving adequate performance can be provided without restricting the circuit size. The filter part 241 can perform the processing at the same oversampling rate as that of the FDE parts 111 and 112. In addition, the computation precision required for providing adequate performance can be ensured. Thus, the filter part 241 is capable of performing high-performance waveform equalization. The filter coefficient in this case is updated depending on the computational result by the low-speed coefficient computation part 142 using the CMA algorithm, for example.

Since the digital optical receiver 1300 according to the present example embodiment includes the carrier recovery sections 351 and 352 to recover carrier signals, a DD algorithm can be used. Although the DD algorithm is difficult to implement because of a problem of feedback loop delay in the high-speed signal processing, the DD algorithm can be implemented in the low-speed signal processing. For the DD algorithm, after determining a symbol position of a carrier signal that has been completely demodulated using the outputs from the carrier recovery sections 351 and 352, a result of this determination is fed back to the low-speed coefficient computation part 142. Accordingly, the DD algorithm can further improve the equalization performance of the filter part 241 as compared with the CMA scheme in which a control is performed feeding back a signal before symbol decision.

In the computation part 152, the distortion compensation coefficient calculated by the low-speed coefficient computation part 142 is multiplied by a dispersion compensation coefficient (a predetermined coefficient) set in the predetermined coefficient holding part 151, and the result of multiplication is fed back to the FDE parts 111 and 112.

At this point, the input digital signals inputted into the FDE parts 111 and 112 are subjected to an equalization process based on the information obtained from the predetermined coefficient holding part 151 and the low-speed coefficient computation part 142. Accordingly, static waveform distortion caused by chromatic dispersion and static waveform distortion caused by factors other than chromatic dispersion are compensated for. Then the TDE part 121 compensates for dynamic distortion such as polarization variations and polarization mode dispersion.

The configuration described above enables the digital optical receiver 1300 according to the present example embodiment to compensate for unknown static waveform distortion that is caused by factors other than chromatic dispersion and is contained in an input signal by using the fixed equalizers (the FDE parts 111 and 112) instead of the adaptive equalizer (the TDE part 121). In other words, it becomes possible to achieve a higher-performance, high-speed signal processor by using the low-speed signal processor that can be implemented with a small-scale circuit configuration.

As described above, according to the digital optical receiver 1300 of the present example embodiment, it becomes possible to compensate for each of different types of waveform distortion by a high-performance equalization process. As a result, a demodulated signal with high signal quality can be obtained.

Fourth Example Embodiment

Next, a fourth example embodiment of the present invention will be described.

Figure 7:
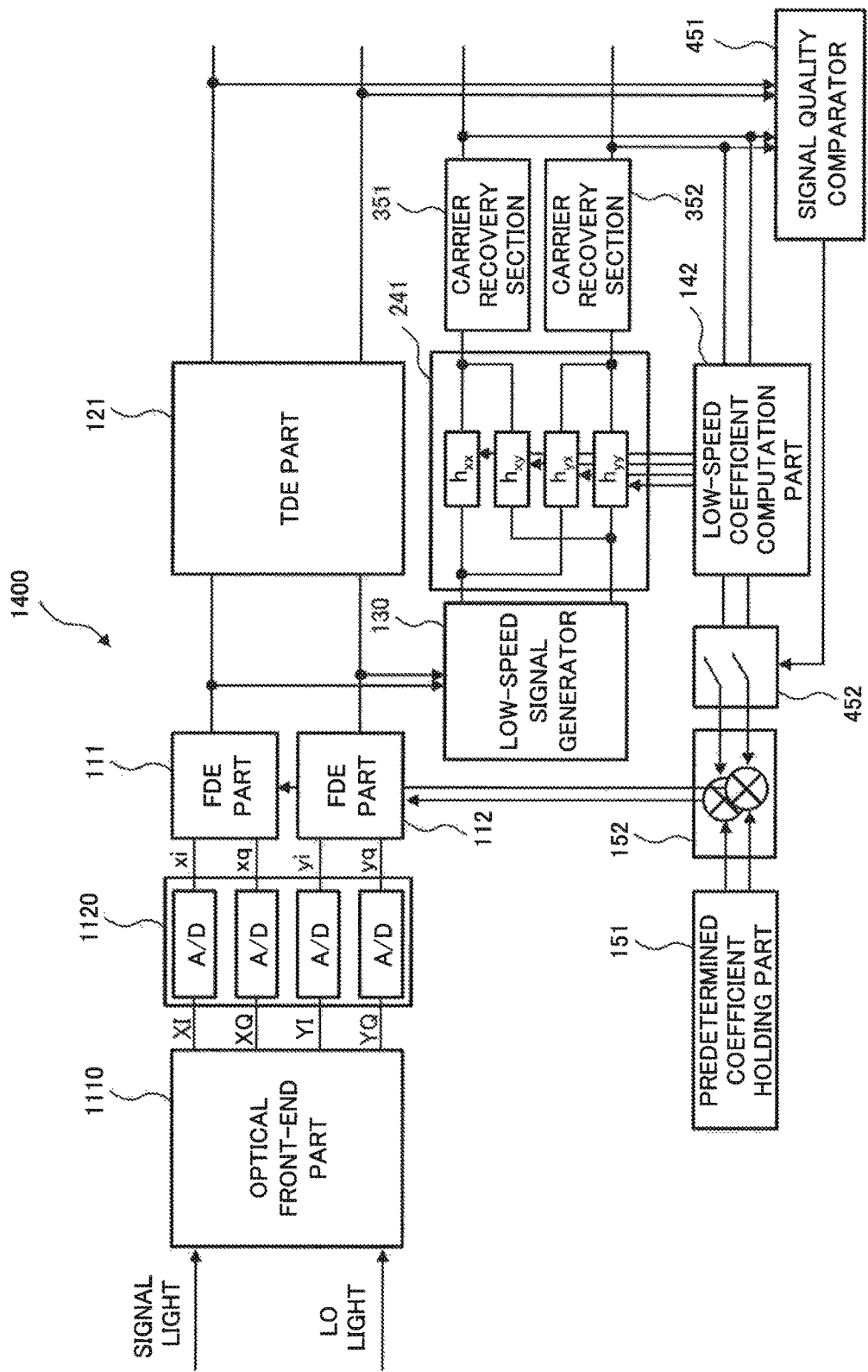
FIG. 7 is a block diagram illustrating a configuration of a digital optical receiver according to a fourth example embodiment of the present invention.

FIG. 7 illustrates a configuration of a digital optical receiver 1400 according to the fourth example embodiment of the present invention. Components that are the same as those of the digital optical receiver 1300 according to the third example embodiment illustrated in FIG. 6 are given the same reference numerals, and description thereof will not be repeated.

As illustrated in FIG. 7, the digital optical receiver 1400 according to the present example embodiment further includes a signal quality comparator 451 as a signal quality comparison means and a switching section 452 as a signal selection means in addition to the configuration of the digital optical receiver 1300 according to the third example embodiment illustrated in FIG. 6.

The signal quality comparator 451 (signal quality comparison means) compares the signal quality of a carrier signal recovered by carrier recovery sections 351 and 352 with the signal quality of an adaptively equalized digital signal output by a TDE part 121 (adaptive equalization means). The signal quality comparator 451 then controls the switching section 452 (signal selection means) based on the result of the comparison. The switching section 452 (signal selection means) chooses between providing and not providing a computation part 152 (computing means).

Next, the operation of the digital optical receiver 1400 according to the present example embodiment will be described.

The digital optical receiver 1400 receives input of signal light that has been distorted in an optical transmission line, for example, dual-polarization quadrature phase shift keying (DP-QPSK) signal light. An optical front-end part 1110 combines the inputted DP-QPSK signal light with local oscillator (LO) light, converts the resulting light into electrical signals, and outputs four-channel electrical signals XI, XQ, YI, and YQ.

The four types of electrical signals XI, XQ, YI, and YQ output by the optical front-end part 1110 are inputted into an analog-digital converter (A/D) 1120, where the electrical signals are converted into digital signals xi, xq, yi, and yq, respectively. The digital signals xi, xq, yi, and yq contain distortion caused by device imperfections in the optical front-end part 1110 and the analog-digital converter 1120 in addition to distortion caused by chromatic dispersion, polarization variations, and polarization mode dispersion that the signal light has suffered in an optical transmission line.

The digital signals xi and xq are inputted into an FDE part 111, and yi and yq are inputted into an FDE part 112, respectively, where the digital signals are equalized based on a predetermined coefficient held in advance by a predetermined coefficient holding part 151.

The FDE parts 111 and 112 are capable of performing high-performance fixed equalization for known static distortion. In the digital optical receiver 1400 according to the present example embodiment, the FDE parts 111 and 112 compensate for chromatic dispersion for which a compensation coefficient can be easily calculated and whose variations with time are small.

Signals equalized in frequency domain by the FDE parts 111 and 112 are inputted into a TDE part 121 as illustrated in FIG. 7, where the signals are subjected to time-domain equalization.

As illustrated in FIG. 2, the TDE part 121 is composed of a butterfly-type finite impulse response (FIR) filter, for example. If adequate compensation performance of the TDE part 121 is to be achieved while maintaining fast control, a huge circuit size will be required. Therefore, a shorter tap length of the TDE part 121 than a required number is chosen, and a slower oversampling rate of the TDE part 121 than that of the FDE part 111 is chosen. Further, the TDE part 121 is achieved by setting its computation precision lower than that of the FDE part 111.

In this way, the TDE part 121 is capable of performing low-performance adaptive equalization for unknown distortion. In the digital optical receiver 1400 according to the present example embodiment, the TDE part 121, with low equalization performance, compensates for static distortion caused by device imperfection of the optical front-end part 1110 and the analog-digital converter (A/D) 1120, for which a compensation coefficient cannot be easily calculated. Further, the TDE part 121 also compensates for dynamic distortion caused by polarization variations and polarization mode dispersion.

On the other hand, digital signals equalized in frequency domain by the FDE parts 111 and 112 are also inputted into a low-speed signal generator 130. The low-speed signal generator 130 intermittently extracts a digital signal containing two types of distortion and generates a low-speed digital signal. The information on dynamic waveform distortion has been lost in the low-speed digital signal. Consequently, the low-speed digital signal with only information on static waveform distortion other than chromatic dispersion is inputted into the filter part 241.

The filter part 241 is composed of a butterfly-type FIR filter, for example. Depending on characteristics of distortion to be compensated for, the filter configuration, the number of filter taps, the type of filter coefficient, and the like can be chosen for the filter part 241.

Because the filter part 241 processes low-speed signals, a tap length required for achieving adequate performance can be provided without restricting the circuit size. The filter part 241 can perform the processing at the same oversampling rate as that of the FDE parts 111 and 112. In addition, the computation precision required for providing adequate performance can be ensured. Thus, the filter part 241 is capable of performing high-performance waveform equalization. The filter coefficient in this case is updated depending on the computational result by the low-speed coefficient computation part 142 using the CMA algorithm, for example.

Since the digital optical receiver 1400 according to the present example embodiment includes the carrier recovery sections 351 and 352 to recover carrier signals, a DD algorithm can be used. Although the DD algorithm is difficult to implement because of a problem of feedback loop delay in the high-speed signal processing, the DD algorithm can be implemented in the low-speed signal processing. For the DD algorithm, after determining a symbol position of a carrier signal that has been completely demodulated using the outputs from the carrier recovery sections 351 and 352, a result of this determination is fed back to the low-speed coefficient computation part 142. Accordingly, the DD algorithm can further improve the equalization performance of the filter part 241 as compared with the CMA scheme in which a control is performed feeding back a signal before symbol decision.

The distortion compensation coefficient calculated by the low-speed coefficient calculation part 142 is based on a low-speed digital signal that the low-speed signal generator 130 intermittently extracts. Consequently, the distortion compensation coefficient does not necessarily have an effect on all of continuous input digital signals inputted into the FDE parts 111 and 112.

In the digital optical receiver 1400 according to the present example embodiment, the signal quality comparator 451 is configured to compare the quality of a signal equalized by the filter part 241 with the quality of a signal equalized by the TDE part 121. The signal quality comparator 451 is configured to control the switching section 452 to allow the signal to pass when the quality of the signal equalized by the filter part 241 is higher. In this case, in the computation part 152, the distortion compensation coefficient calculated by the low-speed coefficient computation part 142 is multiplied by a dispersion compensation coefficient (a predetermined coefficient) set in the predetermined coefficient holding part 151, and the result of multiplication is fed back to the FDE parts 111 and 112.

The configuration described above enables the digital optical receiver 1400 according to the present example embodiment to update a fixed equalization coefficient for the FDE part 111 (fixed equalization means) so that the signal quality of an adaptively equalized digital signal output by the TDE part 121 (adaptive equalization means) may become higher. In this case, a bit error rate or an error vector magnitude (EVM) can be used as the signal quality, for example.

The input digital signal inputted into the FDE parts 111 and 112 is subjected to an equalization process based on the information obtained from the predetermined coefficient holding part 151 and the low-speed coefficient computation part 142. This makes it possible to compensate for static waveform distortion caused by chromatic dispersion and static waveform distortion caused by factors other than chromatic dispersion. The TDE part 121 compensates for dynamic distortion such as polarization variations and polarization mode dispersion.

The configuration described above enables the digital optical receiver 1400 according to the present example embodiment to compensate for unknown static waveform distortion that is caused by factors other than chromatic dispersion and is contained in an input signal by using the fixed equalizers (the FDE parts 111 and 112) instead of the adaptive equalizer (the TDE part 121). In other words, it becomes possible to achieve a higher-performance, high-speed signal processor by using the low-speed signal processor that can be implemented with a small-scale circuit configuration.

As described above, according to the digital optical receiver 1400 of the present example embodiment, it becomes possible to compensate for each of different types of waveform distortion by a high-performance equalization process. As a result, a demodulated signal with high signal quality can be obtained.

Fifth Example Embodiment

Next, a fifth example embodiment of the present invention will be described.

Figure 8:
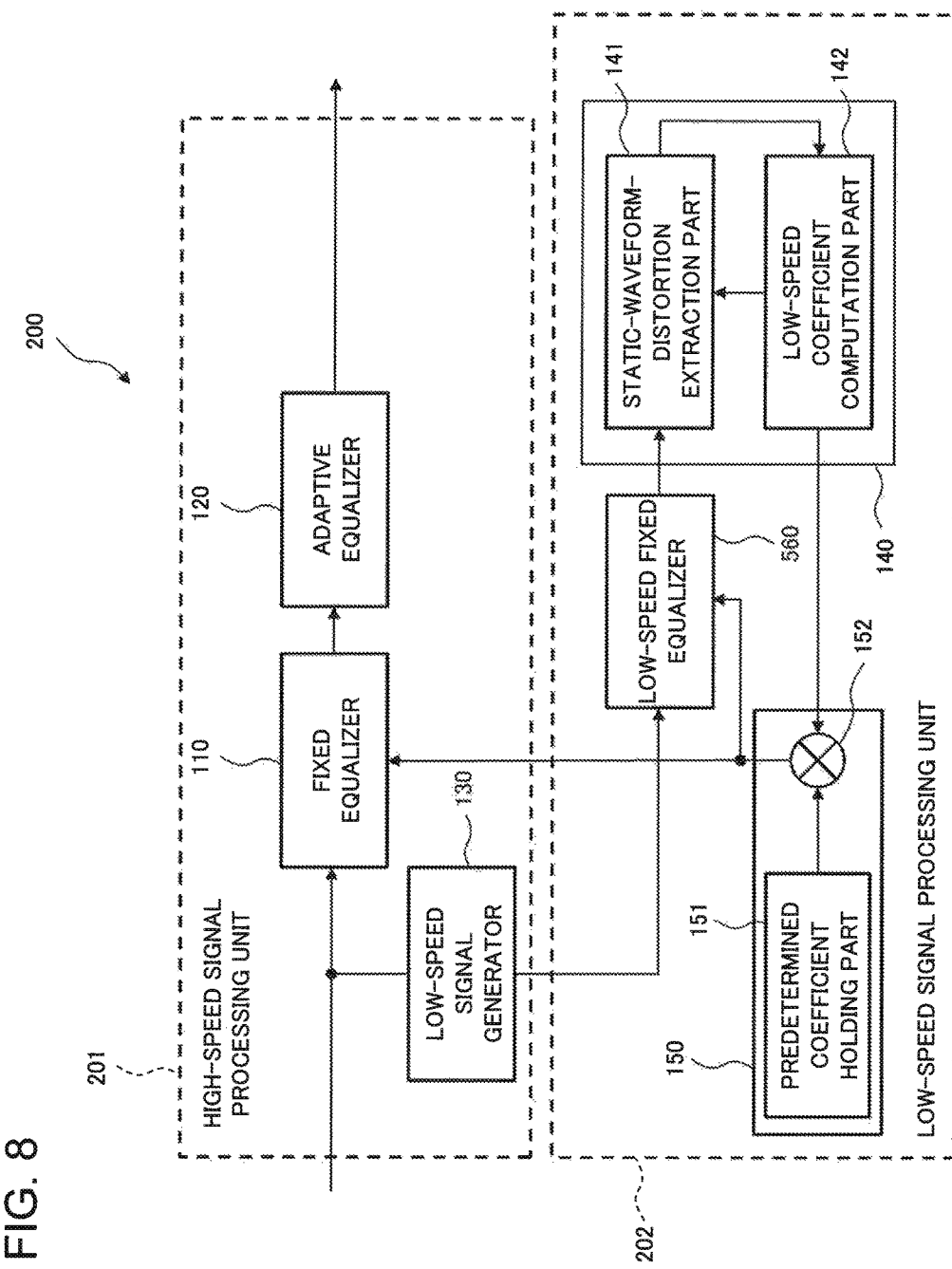
FIG. 8 is a block diagram illustrating a configuration of a digital signal processor according to a fifth example embodiment of the present invention.
Figure 9:
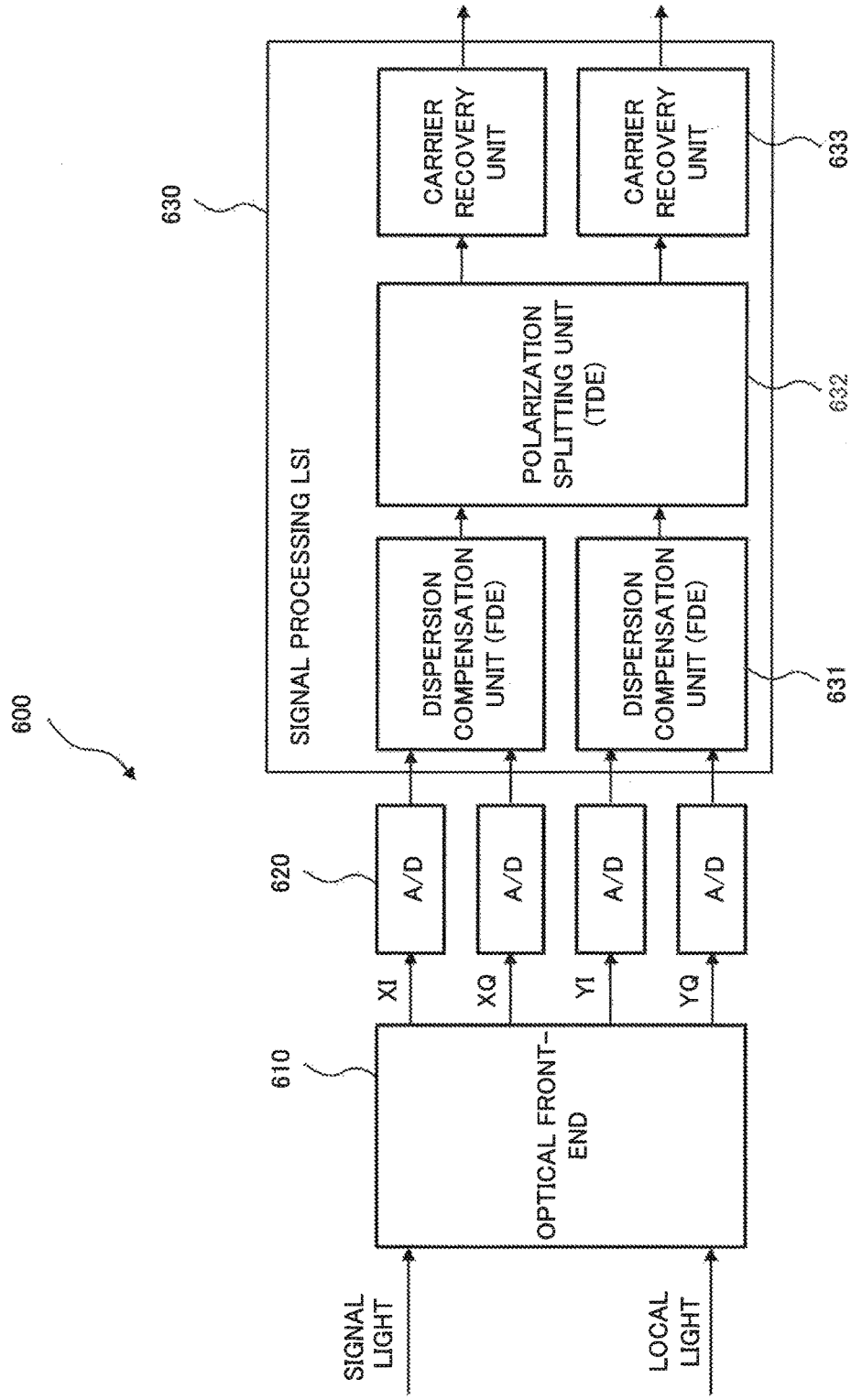
FIG. 9 is a block diagram illustrating a configuration of a related digital coherent optical receiver.

FIG. 8 illustrates a configuration of a digital signal processor 200 according to the fifth example embodiment of the present invention. The digital signal processor 200 includes a fixed equalizer 110 as a fixed equalization means, an adaptive equalizer 120 as an adaptive equalization means, a low-speed signal generator 130 as a low-speed signal generation means, a low-speed equalization coefficient calculation means 140, and a fixed equalization coefficient calculation means 150.

The fixed equalizer 110 performs a distortion compensation process based on a fixed equalization coefficient on an input digital signal. The adaptive equalizer 120 performs an adaptive distortion compensation process based on an adaptive equalization coefficient on an equalized digital signal output by the fixed equalizer 110. The low-speed signal generator 130 generates a low-speed digital signal by intermittently extracting one of the input digital signal and the equalized digital signal. The low-speed equalization coefficient calculation means 140 calculates a low-speed equalization coefficient to be used for a distortion compensation process of a low-speed digital signal. The fixed equalization coefficient calculation means 150 calculates a fixed equalization coefficient by using at least a predetermined coefficient out of the low-speed equalization coefficient and the predetermined coefficient.

The configuration described above is the same as that of the digital signal processor 100 according to the first example embodiment. In the digital signal processor 200 according to the present example embodiment, the low-speed signal generator 130 is located in a stage preceding the fixed equalizer 110. The digital signal processor 200 further includes a low-speed fixed equalizer 560 that serves as a low-speed fixed equalization means for performing a distortion compensation process based on a fixed equalization coefficient on a low-speed digital signal that the low-speed signal generator 130 generates from an input digital signal. The low-speed equalization coefficient calculation means 140 calculates, as a low-speed equalization coefficient, an equalization coefficient to be used for a distortion compensation process of a low-speed equalized digital signal output by the low-speed fixed equalizer 560.

In the digital signal processor 200, the fixed equalizer 110, the adaptive equalizer 120, and the low-speed signal generator 130 constitute a high-speed signal processing unit 201. The low-speed equalization coefficient calculation means 140, the fixed equalization coefficient calculation means 150, and the low-speed fixed equalizer 560 constitute a low-speed signal processing unit 202.

As illustrated in FIG. 8, the low-speed equalization coefficient calculation means 140 can be configured to include a static-waveform-distortion extraction part 141 as a waveform distortion extraction means and a low-speed coefficient computation part 142 as an equalization coefficient computing means. Here, the static-waveform-distortion extraction part 141 extracts waveform distortion from a low-speed equalized digital signal. The low-speed coefficient computation part 142 determines a low-speed equalization coefficient such that the waveform distortion is compensated for.

The fixed equalization coefficient calculation means 150 can be configured to include a predetermined coefficient holding part 151 as a predetermined coefficient holding means for holding a predetermined coefficient in advance and a computation part 152 as a computing means. Here, the computation part 152 calculates a fixed equalization coefficient by performing a computation process on at least a predetermined coefficient out of a low-speed equalization coefficient and the predetermined coefficient.

Next, the operation of the digital signal processor 200 according to the present example embodiment will be described.

An input digital signal inputted into the digital signal processor 200 contains known static waveform distortion, unknown static waveform distortion, and dynamic waveform distortion. The input digital signal inputted into the high-speed signal processing unit 201 is then inputted into the fixed equalizer 110, where the input digital signal is equalized based on a fixed equalization coefficient calculated by the fixed equalization coefficient calculation means 150, and the known static waveform distortion is compensated for. The output signal from the fixed equalizer 110 is inputted into the adaptive equalizer 120 with the unknown static waveform distortion and the dynamic waveform distortion being contained.

The equalization performance of the adaptive equalizer 120 is set lower than that of the fixed equalizer 110 in order to give priority to a fast control. Accordingly, the compensation performance in which the adaptive equalizer 120 equalizes an unknown static waveform distortion and a dynamic waveform distortion becomes lower than the compensation performance in which the fixed equalizer 110 does.

The digital signal processor 200 according to the present example embodiment is configured to input, into the low-speed signal generator 130 also, an input digital signal that is inputted into the fixed equalizer 110. Then the low-speed signal generator 130 is configured to generate a low-speed digital signal by extracting intermittently the digital signal containing the above-mentioned three types of distortion. The information on the dynamic waveform distortion is lost from the low-speed digital signal. Therefore, the low-speed digital signal with the information on the known static waveform distortion and the unknown static waveform distortion being contained is inputted into the low-speed signal processing unit 202.

The low-speed digital signal inputted into the low-speed signal processing unit 202 is inputted into the low-speed fixed equalizer 560, where the low-speed digital signal is equalized based on a fixed equalization coefficient calculated by the fixed equalization coefficient calculation means 150, and the known static waveform distortion is compensated for. The low-speed equalized digital signal output by the low-speed fixed equalizer 560 is inputted into the static-waveform-distortion extraction part 141 with the unknown waveform distortion being contained. The static-waveform-distortion extraction part 141 extracts the unknown static waveform distortion from the low-speed equalized digital signal. Then the low-speed coefficient computation part 142 calculates a distortion compensation coefficient (a low-speed equalization coefficient) to compensate for the waveform distortion. The distortion compensation coefficient calculated by the low-speed coefficient computation part 142 is multiplied in the computation part 152 by a distortion compensation coefficient set in the predetermined coefficient holding part 151 (a predetermined coefficient), and the result is fed back to the fixed equalizer 110 of the high-speed signal processing unit 201.

The configuration described above enables the input digital signal inputted into the high-speed signal processing unit 101 to be inputted into the fixed equalizer 110, where the input digital signal is equalized based on the information obtained from the predetermined coefficient holding part 151 and the low-speed coefficient computation part 142. At this point, the known static waveform distortion and the unknown static waveform distortion are compensated for.

On the other hand, the adaptive equalizer 120 compensates for remaining dynamic waveform distortion.

As described above, the digital signal processor 200 according to the present example embodiment enables the unknown static waveform distortion contained in the input digital signal to be compensated for by using the fixed equalizer 110 instead of the adaptive equalizer 120. In other words, it becomes possible to achieve a higher-performance, high-speed signal processing unit 201 by using the low-speed signal processing unit 202 that can be implemented with a small-scale circuit configuration.

Next, a digital signal processing method according to the present example embodiment will be described.

In the digital signal processing method according to the present example embodiment, first, an equalized digital signal is generated by performing a distortion compensation process based on a fixed equalization coefficient on an input digital signal. A low-speed digital signal is generated by extracting intermittently the input digital signal. A low-speed equalized digital signal is generated by performing a distortion compensation process based on a fixed equalization coefficient on the low-speed digital signal. Then waveform distortion is extracted from the low-speed equalized digital signal. This configuration makes it possible to monitor unknown static waveform distortion contained in the input digital signal.

Then a low-speed equalization coefficient is determined so as to compensate for the waveform distortion, and a fixed equalization coefficient is calculated by performing a computation process on the low-speed equalization coefficient and a predetermined coefficient held in advance. Performing the above-mentioned distortion compensation process using the fixed equalization coefficient calculated here makes it possible to compensate, with high equalization performance, for not only known static waveform distortion contained in the input digital signal but also unknown static waveform distortion.

As described above, according to the digital signal processor 200 and the digital signal processing method of the present example embodiment, it becomes possible to compensate for each of different types of waveform distortion by a high-performance equalization process. As a result, a high-signal-quality demodulated signal can be obtained.

The present invention has been described using the example embodiments as model examples. However, the present invention is not limited to the example embodiments described above. Various modes that can be understood by those skilled in the art may be applied within the scope of the present invention.

This application is based upon and claims the benefit of priority from the Japanese patent application No. 2014-259002, filed on Dec. 22, 2014, the disclosure of which is incorporated herein in its entirety by reference.

The whole or part of the example embodiments disclosed above can be described as, but not limited to, the following supplementary notes.

(Supplementary note 1) A digital signal processor, comprising: a fixed equalization means for performing a distortion compensation process based on a fixed equalization coefficient on an input digital signal; an adaptive equalization means for performing an adaptive distortion compensation process based on an adaptive equalization coefficient on an equalized digital signal output by the fixed equalization means; a low-speed signal generation means for generating a low-speed digital signal by intermittently extracting one of the input digital signal and the equalized digital signal; a low-speed equalization coefficient calculation means for calculating a low-speed equalization coefficient to be used for a distortion compensation process of the low-speed digital signal; and a fixed equalization coefficient calculation means for calculating the fixed equalization coefficient by using at least a predetermined coefficient out of the low-speed equalization coefficient and the predetermined coefficient.

(Supplementary note 2) The digital signal processor according to Supplementary note 1, wherein the fixed equalization means includes a frequency-domain equalization means for performing equalization in a frequency domain, the adaptive equalization means includes a time-domain equalization means for performing equalization in a time domain, and equalization performance of the time-domain equalization means is set lower than equalization performance of the frequency-domain equalization means.

(Supplementary note 3) The digital signal processor according to Supplementary note 1 or 2, wherein the low-speed signal generation means generates the low-speed digital signal from the equalized digital signal, the low-speed equalization coefficient calculation means includes a waveform distortion extraction means for extracting waveform distortion from the low-speed digital signal, and an equalization coefficient computing means for determining the low-speed equalization coefficient so as to compensate for the waveform distortion, and the fixed equalization coefficient calculation means includes a predetermined coefficient holding means for holding the predetermined coefficient in advance, and a computing means for calculating the fixed equalization coefficient by performing a computation process on at least the predetermined coefficient out of the low-speed equalization coefficient and the predetermined coefficient.

(Supplementary note 4) The digital signal processor according to Supplementary note 3, wherein the waveform distortion extraction means includes a filter means for performing a filtering process based on a filter coefficient, and the equalization coefficient computing means updates the filter coefficient depending on an output signal from the filter means.

(Supplementary note 5) The digital signal processor according to Supplementary note 3 or 4, further comprising a carrier signal recovery means for recovering a carrier signal from an output signal output by the waveform distortion extraction means, wherein the equalization coefficient computing means calculates the low-speed equalization coefficient based on the carrier signal.

(Supplementary note 6) The digital signal processor according to Supplementary note 5, further comprising: a signal selection means for choosing between providing and not providing the low-speed equalization coefficient for the computing means; and a signal quality comparison means for comparing signal quality of the carrier signal with signal quality of an adaptively equalized digital signal output by the adaptive equalization means, and controlling the signal selection means based on a comparison result.

(Supplementary note 7) The digital signal processor according to Supplementary note 1 or 2, further comprising a low-speed fixed equalization means for performing a distortion compensation process based on the fixed equalization coefficient on the low-speed digital signal, wherein the low-speed signal generation means is located in a stage preceding the fixed equalization means, and the low-speed equalization coefficient calculation means calculates, as the low-speed equalization coefficient, an equalization coefficient to be used for a distortion compensation process of a low-speed equalized digital signal output by the low-speed fixed equalization means.

(Supplementary note 8) A digital optical receiver, comprising: the digital signal processor according to any one of Supplementary notes 1, 2, 3, 4, 5, 6, and 7; an optical front-end means for combining inputted signal light with local oscillation light and converting resulting light into an electrical signal; and an analog-digital conversion means for converting the electrical signal output by the optical front-end means into a digital signal, generating the input digital signal, and outputting the input digital signal to the digital signal processor.

(Supplementary note 9) A digital signal processing method, comprising: generating an equalized digital signal by performing a distortion compensation process based on a fixed equalization coefficient on an input digital signal; generating a low-speed digital signal by extracting the equalized digital signal intermittently; and extracting waveform distortion from the low-speed digital signal.

(Supplementary note 10) The digital signal processing method according to Supplementary note 9, further comprising determining a low-speed equalization coefficient so as to compensate for the waveform distortion, and calculating the fixed equalization coefficient by performing a computation process on the low-speed equalization coefficient and a predetermined coefficient held in advance.

(Supplementary note 11) A digital signal processing method, comprising: generating an equalized digital signal by performing a distortion compensation process based on a fixed equalization coefficient on an input digital signal to; generating a low-speed digital signal by extracting intermittently the input digital signal; generating a low-speed equalized digital signal by performing a distortion compensation process based on the fixed equalization coefficient on the low-speed digital signal; and extracting waveform distortion from the low-speed equalized digital signal.

(Supplementary note 12) The digital signal processing method according to Supplementary note 11, further comprising determining a low-speed equalization coefficient so as to compensate for the waveform distortion, and calculating the fixed equalization coefficient by performing a computation process on the low-speed equalization coefficient and a predetermined coefficient held in advance.

REFERENCE SIGNS LIST 1100, 1200, 1300, 1400 Digital optical receiver
1110 Optical front-end part
1120 Analog-digital converter (A/D)
100, 200 Digital signal processor
101, 201 High-speed signal processing unit
102, 202 Low-speed signal processing unit
110 Fixed equalizer
111, 112 FDE part
113 Discrete Fourier transform unit
114 Multiplier
115 Inverse discrete Fourier transform unit
120 Adaptive equalizer
121 TDE part
122 High-speed coefficient computation part
130 Low-speed signal generator
140 Low-speed equalization coefficient calculation means
141 Static-waveform-distortion extraction part
142 Low-speed coefficient computation part
150 Fixed equalization coefficient calculation means
151 Predetermined coefficient holding part
152 Computation part
241 Filter part
351, 352 Carrier recovery section
451 Signal quality comparator
452 Switching section
560 Low-speed fixed equalizer
600 Related digital coherent optical receiver
610 Optical front-end
620 Analog-digital (A/D) converter
630 Signal processing LSI
631 Dispersion compensation unit
632 Polarization splitting unit
633 Carrier recovery section

What is claimed is:

1. A digital signal processor, comprising:
a fixed equalizer configured to perform a distortion compensation process based on a fixed equalization coefficient on an input digital signal;
an adaptive equalizer configured to perform an adaptive distortion compensation process based on an adaptive equalization coefficient on an equalized digital signal output by the fixed equalizer;
a low-speed signal generator configured to generate a low-speed digital signal by intermittently extracting one of the input digital signal and the equalized digital signal;
a low-speed equalization coefficient calculation part implemented at least in hardware and configured to calculate a low-speed equalization coefficient to be used for a distortion compensation process of the low-speed digital signal; and
a fixed equalization coefficient calculation part implemented at least in the hardware and configured to calculate the fixed equalization coefficient by using, out of the low-speed equalization coefficient and a predetermined coefficient obtained by back calculation from a transfer function of a transmission line, the predetermined coefficient.

2. The digital signal processor according to claim 1, wherein the fixed equalizer includes a frequency-domain equalizer configured to perform equalization in a frequency domain,
the adaptive equalizer includes a time-domain equalizer configured to perform equalization in a time domain, and
equalization performance of the time-domain equalizer is set lower than equalization performance of the frequency-domain equalizer.

3. The digital signal processor according to claim 2, wherein the low-speed signal generator generates the low-speed digital signal from the equalized digital signal,
the low-speed equalization coefficient calculation part includes a waveform distortion extraction part implemented at least in the hardware and configured to extract waveform distortion from the low-speed digital signal, and an equalization coefficient computation part implemented at least in the hardware and configured to determine the low-speed equalization coefficient so as to compensate for the waveform distortion, and
the fixed equalization coefficient calculation part includes a predetermined coefficient holding part implemented at least in the hardware and configured to hold the predetermined coefficient in advance, and a computation part implemented at least in the hardware and configured to calculate the fixed equalization coefficient by performing a computation process on at least the predetermined coefficient out of the low-speed equalization coefficient and the predetermined coefficient.

4. The digital signal processor according to claim 2, further comprising
a low-speed fixed equalizer configured to perform a distortion compensation process based on the fixed equalization coefficient on the low-speed digital signal,
wherein the low-speed signal generator is located in a stage preceding the fixed equalizer, and
the low-speed equalization coefficient calculation part calculates, as the low-speed equalization coefficient, an equalization coefficient to be used for a distortion compensation process of a low-speed equalized digital signal output by the low-speed fixed equalizer.

5. The digital signal processor according to claim 1,
wherein the low-speed signal generator generates the low-speed digital signal from the equalized digital signal,
the low-speed equalization coefficient calculation part includes a waveform distortion extraction part implemented at least in the hardware and configured to extract waveform distortion from the low-speed digital signal, and an equalization coefficient computation part implemented at least in the hardware and configured to determine the low-speed equalization coefficient so as to compensate for the waveform distortion, and
the fixed equalization coefficient calculation part includes a predetermined coefficient holding part implemented at least in the hardware and configured to hold the predetermined coefficient in advance, and a computation part implemented at least in the hardware and configured to calculate the fixed equalization coefficient by performing a computation process on at least the predetermined coefficient out of the low-speed equalization coefficient and the predetermined coefficient.

6. The digital signal processor according to claim 5,
wherein the waveform distortion extraction part includes a filter part implemented at least in the hardware and configured to perform a filtering process based on a filter coefficient, and
the equalization coefficient computation part updates the filter coefficient depending on an output signal from the filter part.

7. The digital signal processor according to claim 6, further comprising
a carrier signal recovery section implemented at least in the hardware and configured to recover a carrier signal from an output signal output by the waveform distortion extraction part,
wherein the equalization coefficient computation part calculates the low-speed equalization coefficient based on the carrier signal.

8. The digital signal processor according to claim 5, further comprising
a carrier signal recovery section implemented at least in the hardware and configured to recover a carrier signal from an output signal output by the waveform distortion extraction part,
wherein the equalization coefficient computation part calculates the low-speed equalization coefficient based on the carrier signal.

9. The digital signal processor according to claim 8, further comprising:
a signal selection section implemented at least in the hardware and configured to choose between providing and not providing the low-speed equalization coefficient for the computation part; and
a signal quality comparator configured to compare signal quality of the carrier signal with signal quality of an adaptively equalized digital signal output by the adaptive equalizer, and controlling the signal selection section based on a comparison result.

10. The digital signal processor according to claim 1, further comprising
a low-speed fixed equalizer configured to perform a distortion compensation process based on the fixed equalization coefficient on the low-speed digital signal,
wherein the low-speed signal generator is located in a stage preceding the fixed equalizer, and
the low-speed equalization coefficient calculation part calculates, as the low-speed equalization coefficient, an equalization coefficient to be used for a distortion compensation process of a low-speed equalized digital signal output by the low-speed fixed equalizer.

11. A digital optical receiver, comprising:
a digital signal processor including
a fixed equalizer configured to perform a distortion compensation process based on a fixed equalization coefficient on an input digital signal,
an adaptive equalizer configured to perform an adaptive distortion compensation process based on an adaptive equalization coefficient on an equalized digital signal output by the fixed equalizer,
a low-speed signal generator configured to generate a low-speed digital signal by intermittently extracting one of the input digital signal and the equalized digital signal,
a low-speed equalization coefficient calculation part implemented at least in hardware and configured to calculate a low-speed equalization coefficient to be used for a distortion compensation process of the low-speed digital signal, and
a fixed equalization coefficient calculation part implemented at least in the hardware and configured to calculate the fixed equalization coefficient by using, out of the low-speed equalization coefficient and a predetermined coefficient obtained by back calculation from a transfer function of a transmission line, the predetermined coefficient;
an optical front-end part implemented at least in the hardware and configured to combine inputted signal light with local oscillation light and convert resulting light into an electrical signal; and
an analog-digital converter configured to convert the electrical signal output by the optical front-end part into a digital signal, generate the input digital signal, and output the input digital signal to the digital signal processor.

12. The digital optical receiver according to claim 11,
wherein the fixed equalizer includes a frequency-domain equalizer configured to perform equalization in a frequency domain,
the adaptive equalizer includes a time-domain equalizer configured to perform equalization in a time domain, and
equalization performance of the time-domain equalizer is set lower than equalization performance of the frequency-domain equalizer.

13. The digital optical receiver according to claim 12,
wherein the low-speed signal generator generates the low-speed digital signal from the equalized digital signal, the low-speed equalization coefficient calculation part includes a waveform distortion extraction part implemented at least in the hardware and configured to extract waveform distortion from the low-speed digital signal, and an equalization coefficient computation part implemented at least in the hardware and configured to determine the low-speed equalization coefficient so as to compensate for the waveform distortion, and the fixed equalization coefficient calculation part includes a predetermined coefficient holding part implemented at least in the hardware and configured to hold the predetermined coefficient in advance, and a computation part implemented at least in the hardware and configured to calculate the fixed equalization coefficient by performing a computation process on at least the predetermined coefficient out of the low-speed equalization coefficient and the predetermined coefficient.

14. The digital optical receiver according to claim 11,
wherein the low-speed signal generator generates the low-speed digital signal from the equalized digital signal, the low-speed equalization coefficient calculation part includes a waveform distortion extraction part implemented at least in the hardware and configured to extract waveform distortion from the low-speed digital signal, and an equalization coefficient computation part implemented at least in the hardware and configured to determine the low-speed equalization coefficient so as to compensate for the waveform distortion, and the fixed equalization coefficient calculation part includes a predetermined coefficient holding part implemented at least in the hardware and configured to hold the predetermined coefficient in advance, and a computation part implemented at least in the hardware and configured to calculate the fixed equalization coefficient by performing a computation process on at least the predetermined coefficient out of the low-speed equalization coefficient and the predetermined coefficient.

15. The digital optical receiver according to claim 14,
wherein the waveform distortion extraction part includes a filter part implemented at least in the hardware and configured to perform a filtering process based on a filter coefficient, and the equalization coefficient computation part updates the filter coefficient depending on an output signal from the filter part.

16. The digital optical receiver according to claim 14, further comprising
a carrier signal recovery section implemented at least in the hardware and configured to recover a carrier signal from an output signal output by the waveform distortion extraction part, wherein the equalization coefficient computation part calculates the low-speed equalization coefficient based on the carrier signal.

17. The digital optical receiver according to claim 16, further comprising:
a signal selection section implemented at least in the hardware and configured to choose between providing and not providing the low-speed equalization coefficient for the computation part; and a signal quality comparator configured to compare signal quality of the carrier signal with signal quality of an adaptively equalized digital signal output by the adaptive equalizer, and controlling the signal selection section based on a comparison result.

18. The digital optical receiver according to claim 11, further comprising
a low-speed fixed equalizer configured to perform a distortion compensation process based on the fixed equalization coefficient on the low-speed digital signal, wherein the low-speed signal generator is located in a stage preceding the fixed equalizer, and the low-speed equalization coefficient calculation part calculates, as the low-speed equalization coefficient, an equalization coefficient to be used for a distortion compensation process of a low-speed equalized digital signal output by the low-speed fixed equalizer.

* * * * *